(12) United States Patent
Kuzniar et al.

(10) Patent No.: US 8,169,324 B2
(45) Date of Patent: May 1, 2012

(54) SYSTEM FOR TRACKING OBJECTS

(76) Inventors: James Kuzniar, Queensville (CA);
Malcolm Cole, Guelph (CA)

( * ) Notice: Subject to any disclaimer, the term of this patent is extended or adjusted under 35 U.S.C. 154(b) by 378 days.

(21) Appl. No.: 12/469,281

(22) Filed: May 20, 2009

(65) Prior Publication Data
US 2010/0295687 A1 Nov. 25, 2010

(51) Int. Cl.
*G08B 23/00* (2006.01)
(52) U.S. Cl. ............... 340/573.1; 119/712; 340/573.3; 340/572.7
(58) Field of Classification Search ........... 340/573.1, 340/573.3, 572.1, 572.4, 572.7, 572.8; 119/712
See application file for complete search history.

(56) References Cited

U.S. PATENT DOCUMENTS

| | | | |
|---|---|---|---|
| 4,274,083 A | 6/1981 | Tomoeda | |
| 4,617,876 A | 10/1986 | Hayes | |
| 5,183,008 A | 2/1993 | Carrano | |
| 5,621,388 A | 4/1997 | Sherburne et al. | |
| 5,791,294 A | 8/1998 | Manning | |
| 5,959,526 A | 9/1999 | Tucker | |
| 6,135,055 A | 10/2000 | Pratt | |
| 6,341,582 B1 | 1/2002 | Gompper et al. | |
| 6,342,839 B1 | 1/2002 | Curkendall et al. | |
| 6,684,810 B2 | 2/2004 | Martin | |
| 6,833,790 B2 * | 12/2004 | Mejia et al. | ............... 340/572.7 |
| 6,847,892 B2 | 1/2005 | Zhou et al. | |
| 7,028,638 B2 | 4/2006 | Bonsall | |
| 7,059,275 B2 | 6/2006 | Laitinen et al. | |
| 7,123,153 B2 | 10/2006 | Thorstensen et al. | |
| 7,164,361 B2 | 1/2007 | Poliska | |
| 7,234,421 B2 | 6/2007 | Natividade et al. | |
| 2003/0062001 A1 | 4/2003 | Andersson | |
| 2006/0114109 A1 | 6/2006 | Geissler | |
| 2006/0145875 A1 | 7/2006 | Finlayson | |
| 2006/0289637 A1 * | 12/2006 | Brice et al. | ............... 235/385 |
| 2007/0200701 A1 * | 8/2007 | English et al. | ............. 340/572.1 |

* cited by examiner

*Primary Examiner* — Thomas Mullen
(74) *Attorney, Agent, or Firm* — Etienne de Villiers; Dimock Stratton LLP

(57) ABSTRACT

A system is provided of tracking objects loaded into a receptacle, where the receptacle defines a chamber having an open side for receiving the objects and has a perimeter about the open side. The system comprises a radio frequency identification antenna spaced from the receptacle and attached to the perimeter about the open side, and a radio frequency identification reader attached to the receptacle for receiving a signal from the antenna. The system further comprises a control unit attached to the receptacle communicating with the reader for processing the signal from the antenna.

15 Claims, 6 Drawing Sheets

SYSTEM FOR TRACKING OBJECTS

BACKGROUND OF THE INVENTION

The present invention relates to a system for tracking objects being loaded into a receptacle.

A demand exists in various industries for convenient and effective means for tracking objects. For example, the livestock industry requires an effective system for tracking animals, such as cattle, being loaded into and then transported on animal trailers or railway cars. Similar systems are required by shipping and airline industries for tracking parcels and luggage.

Various systems for tracking objects are known in the art. For example, U.S. Pat. No. 6,847,892 discloses a system for remotely tracking the location and parameters of moving objects, such as animals, luggage, as well as humans. US Published Application No. US 2003/0062001 A1 discloses a system for controlling and authenticating the quality and origin of animals and meat products which tracks information about the animals' and meat products' location throughout the production cycle. U.S. Pat. No. 7,028,638 describes an animal transportation and tracking system that allows for the maintenance of automatic records of animals that leave a truck.

Of special interest to the design of a system for tracking objects is the step of loading the objects into a receptacle, such as a truck or a bus, and the step of unloading the objects. Various systems for performing these tasks are known in the art, many of which use radio frequency identification ("RFID") technology to identify and track the objects. For example, U.S. Pat. No. 6,847,892 discloses a system for tracking school children getting on and off a school bus, where each child is equipped with an RFID tag which is scanned with a radio frequency ("RF") receiver located at the entrance of the bus.

Furthermore, US Published Patent Application No. US2003/0062001 A1 discloses a monitoring system for livestock, which includes a system for tracking animals and animal products loaded onto a transport truck, where RFID tags attached to the animals or products are scanned by an antenna system attached to the gate of a truck.

In addition, U.S. Pat. No. 7,028,638 discloses a transceiver located at truck exit or entry points which reads transponders located on animals entering and existing the truck. The communication technology used in U.S. Pat. No. 7,028,638 is said to be known in the livestock industry, such as EZ-ID products manufactured by EZID, LLC.

Known systems, however, do not provide the ability to automatically identify and track each object being loaded into or unloaded from a receptacle using RF technology, where the receptacle comprises large amounts of metal. Examples of such receptacles are animal transport trailers, buses and railroad cars. Mounting an RF receiver or antenna around an opening to such a receptacle presents difficulties, in that the metal structure interferes with the operation of the RF antenna.

SUMMARY OF THE INVENTION

According to one aspect of the invention, there is provided a system of tracking objects loaded into a receptacle, where the receptacle defines a chamber having an open side for receiving the objects and has a perimeter about the open side. The system comprises a radio frequency identification antenna spaced from the receptacle and attached to the perimeter about the open side, and a radio frequency identification reader attached to the receptacle for receiving a signal from the antenna. The system further comprises a control unit attached to the receptacle communicating with the reader for processing the signal from the antenna.

According to another aspect of the invention, there is provided a system of tracking objects loaded into a receptacle, where the receptacle defines a chamber having an open side for receiving the objects and has a perimeter about the open side. The system comprises a mounting frame attached to the perimeter about the open side, a radio frequency identification antenna attached to the mounting frame, the radio frequency identification antenna being spaced from said receptacle and a radio frequency identification reader attached to the receptacle for receiving a signal from the antenna. The system further comprises a control unit attached to the receptacle communicating with the reader for processing the signal from the antenna.

DETAILED DESCRIPTION OF THE INVENTION

Figure 1:
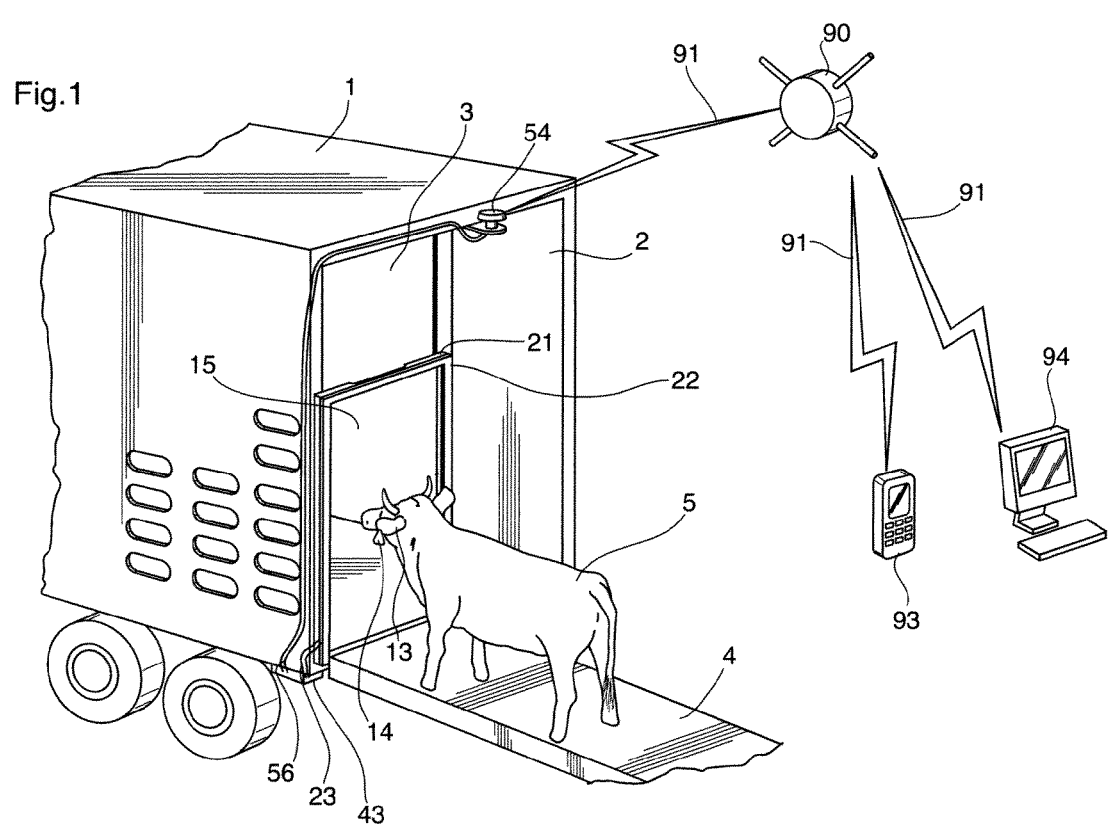
FIG. 1 is a rear upper perspective view of the present invention mounted around a doorway of an animal trailer.
Figure 2:
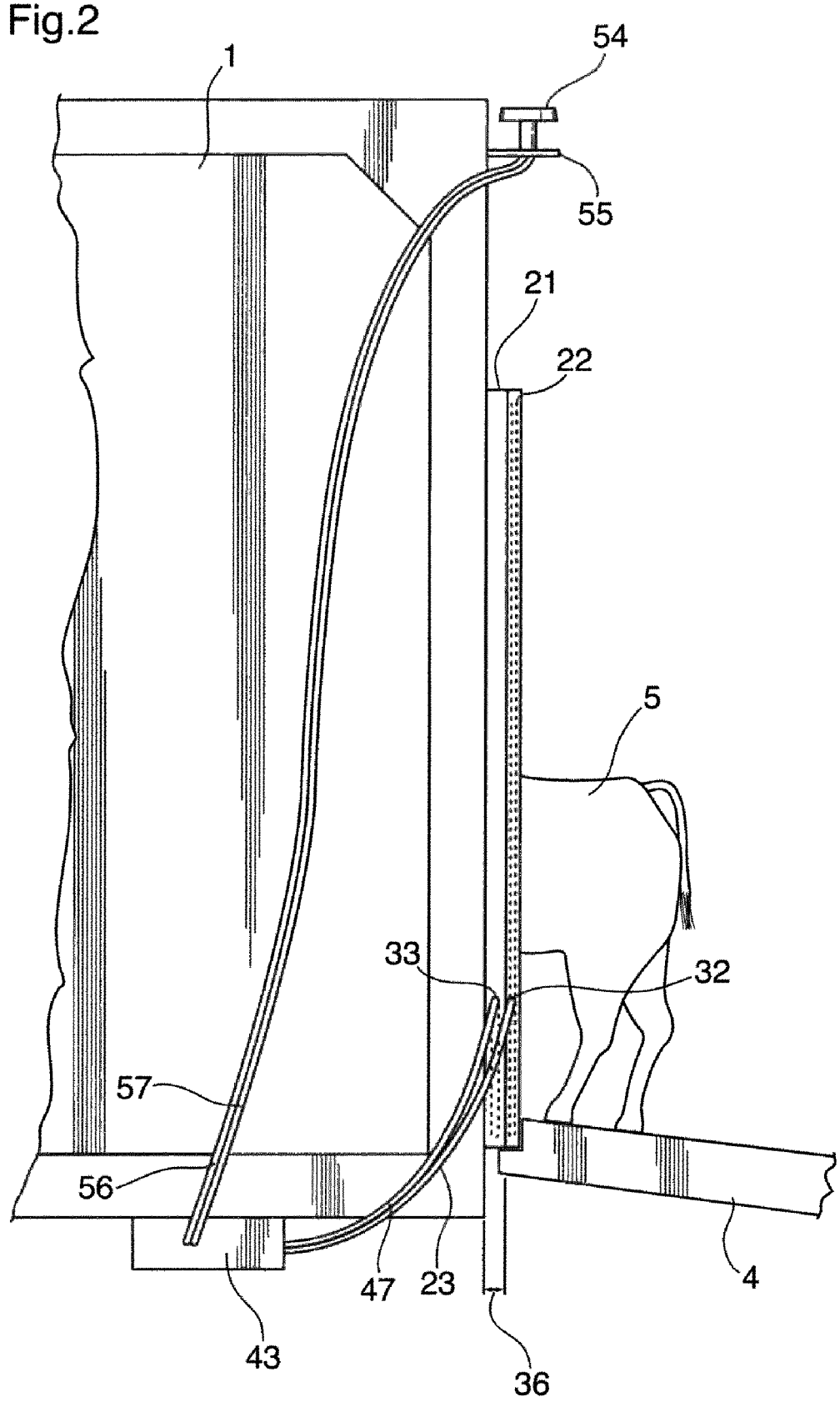
FIG. 2 is a left side view of the present invention mounted around a doorway of an animal trailer.
Figure 3:
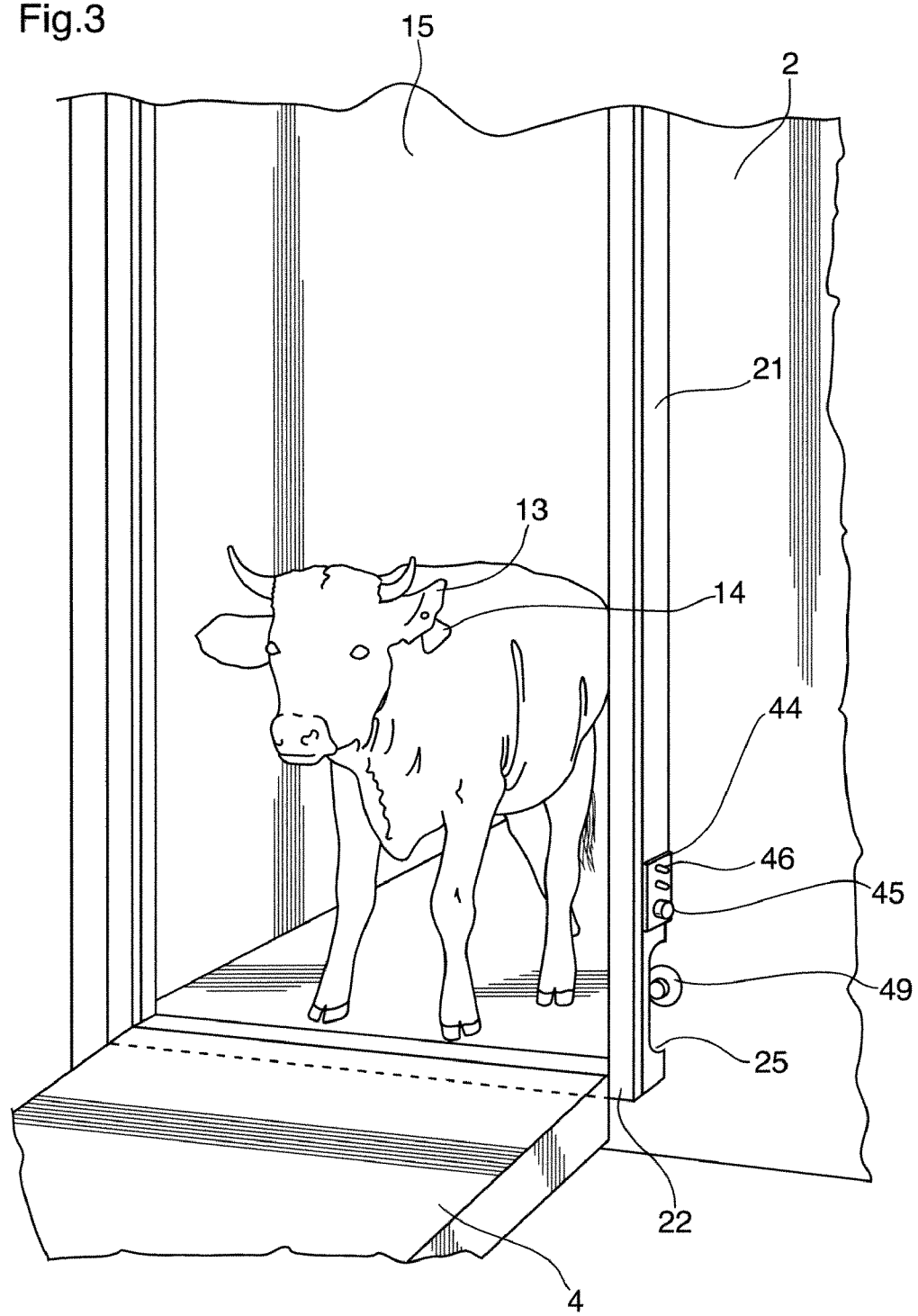
FIG. 3 is a partial rear perspective view of the present invention mounted around a doorway of an animal trailer.
Figure 4:
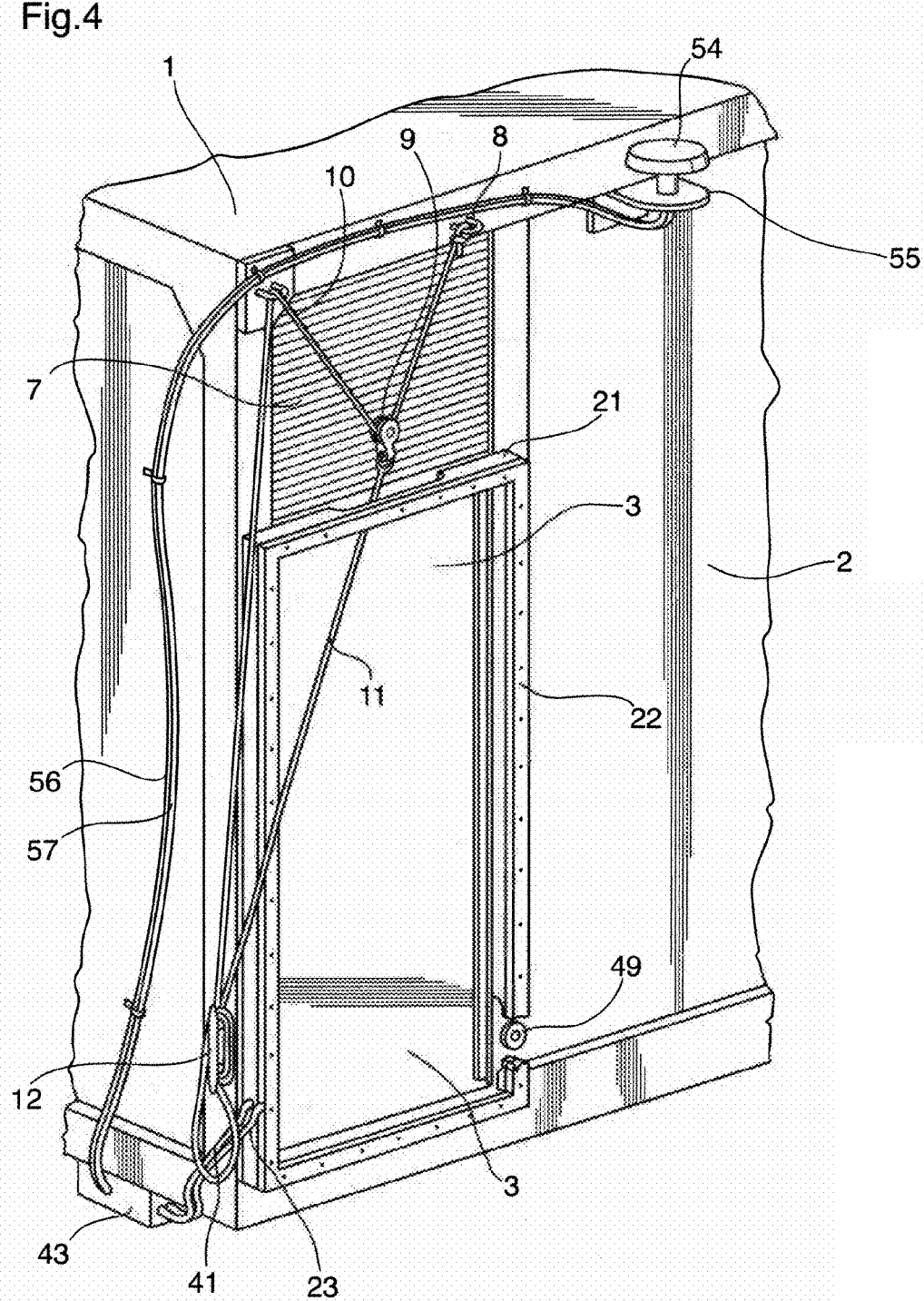
FIG. 4 is a rear sectional perspective view of the present invention mounted around a doorway of an animal trailer.
Figure 5:
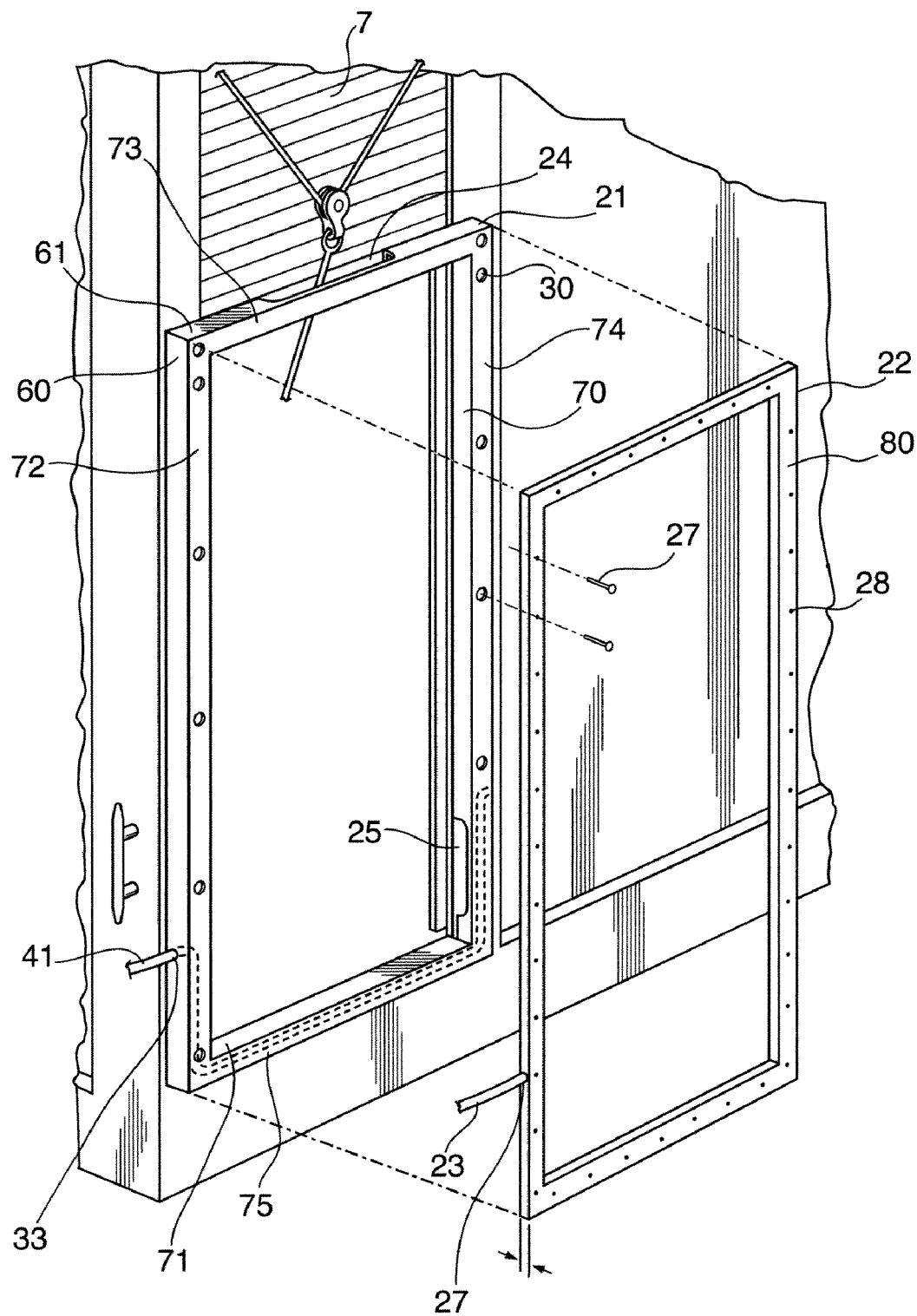
FIG. 5 is an exploded view of the present invention mounted around a doorway of an animal trailer.
Figure 6:
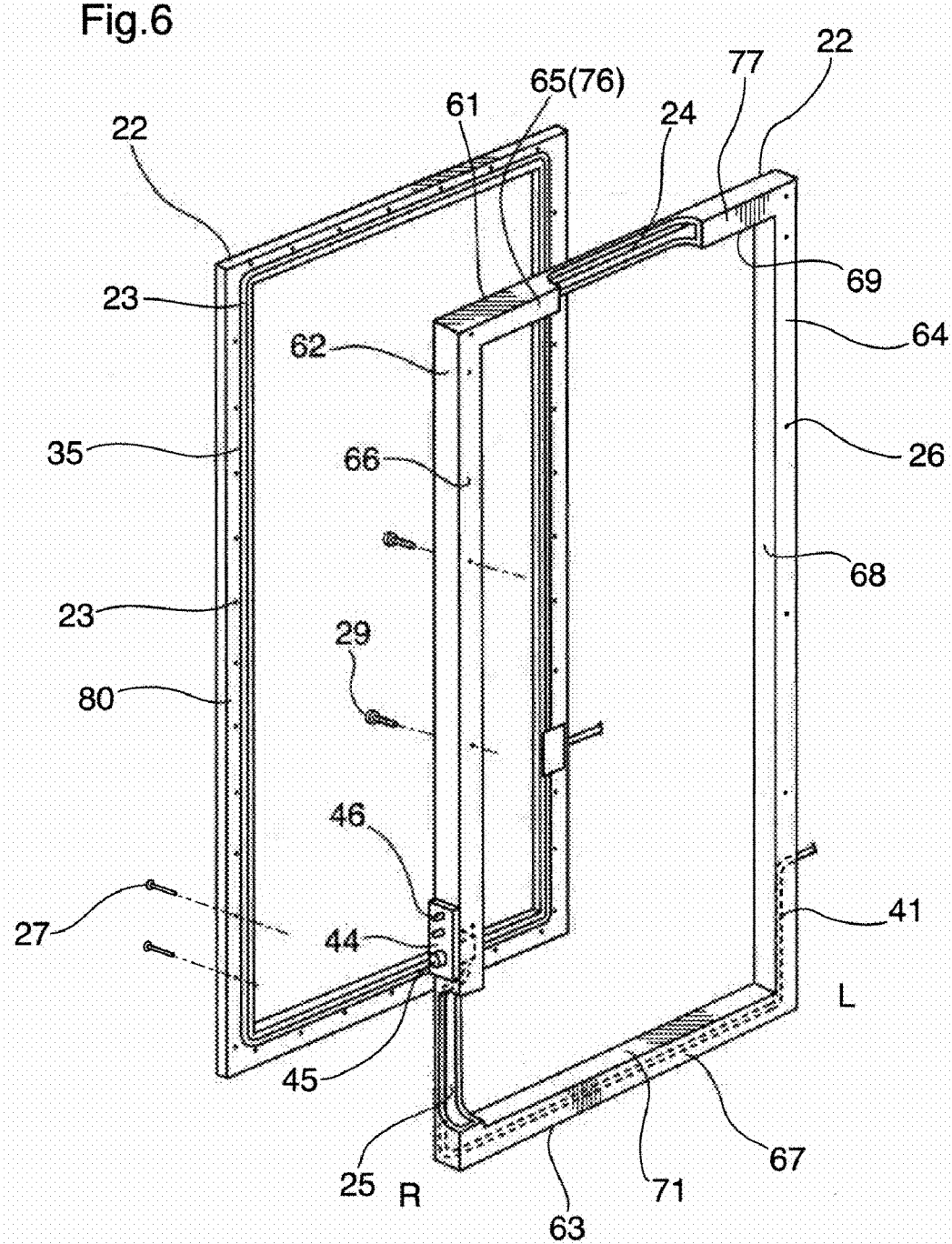
FIG. 6 is an exploded view of the present invention.

FIGS. 1 to 6 illustrate a system for tracking objects of the present invention, which in the preferred embodiment the system is used in conjunction with a receptacle which is preferably an animal trailer 1, defining a chamber 15, and having an open side such as a doorway 3, with a perimeter for receiving an animal, such as a head of cattle 5. The system in the illustrated preferred embodiment further comprises a mounting frame 21 attached to the perimeter and an antenna housing 22 containing the RFID antenna 23 attached to the mounting frame 21.

The mounting frame 21 has a mounting frame thickness 36 for spacing antenna 23 from trailer 1 by a predetermined distance, and comprises a left outer side wall 60, top outer side wall 61, right outer side wall 62, bottom outer side wall 63, left inner side wall 68, top inner side wall 69, right inner side wall 70, bottom inner side wall 71, left trailer-facing wall 64, top trailer-facing wall 65, right trailer-facing wall 66, bottom trailer-facing wall 67, left out-facing wall 72, top out-facing wall 73, right out-facing wall 74, and bottom out-facing wall 75 joined together to form a hollow frame 21. The mounting frame 21 further has mounting holes 26 in the left trailer-facing wall 64 and right trailer-facing wall 66 for attaching the mounting frame 21 to the perimeter 16 of the open side 3 with self-tapping screws 29. The mounting frame 21 further has openings 30 in the left out-facing wall 72 and right out-facing wall 74 which allow access to the self-tapping screws 29 when they are placed in the mounting holes 26. In addition, the left out-facing wall 72, top out-facing wall 73, right out-facing wall 74, and bottom out-facing wall 75 have a number of threaded holes (not shown) for mounting the antenna housing 22. Furthermore, the right out-facing wall 74 has a cable exit opening 32.

The minimum distance for spacing the antenna 23 from trailer 1 is preferably 2.5 inches. Larger distances for spacing the antenna 23 from trailer are also within the scope of the present invention.

In the preferred embodiment, the mounting frame is disposed between the receptacle and the antenna and functions as a spacing means. A person skilled in the art would understand that other spacing means that create a space between the receptacle and the antenna can be employed.

Attached to the mounting frame 21 is an antenna tune button 45 and status LEDs 46 in housing 44. The tune button 45 and status LEDs 46 are connected to a control unit 43 through a tune button cable 41 which runs along the bottom of the mounting frame 21.

The antenna housing 22 has a mounting frame-facing surface 80, an out-facing surface 82 and a thickness 81. The antenna housing 22 has an antenna channel 35 made in the mounting frame-facing surface 80 for receiving the antenna 23. In addition, the antenna housing 22 has a number of mounting holes 28 for mounting the antenna housing 22 to the mounting frame 21 by way of antenna housing mounting bolts 27 screwed through the mounting holes 28 into the threaded holes in the left out-facing wall 72, top out-facing wall 73, right out-facing wall 74, and bottom out-facing wall 75 of the mounting frame 21. Furthermore, the antenna housing 22 has an antenna exit opening 32. The antenna 23 runs inside the antenna channel 35 around the frame-facing surface 80, and exists the antenna housing 22 through the antenna exit opening 33.

The mounting frame 21 is attached to the perimeter 16 of the open side 3 by using self-tapping screws 29 placed through mounting holes 26. The antenna housing 22 containing the antenna 23 is attached to the mounting frame 21 by way of antenna housing mounting bolts 27 screwed through the mounting holes 26 into the threaded holes in the left out-facing wall 72, top out-facing wall 73, right out-facing wall 74, and bottom out-facing wall 75 of the mounting frame 21. The tune button cable 41 exits the mounting frame 21 at the cable exit opening 32 and runs to the control unit 43. The antenna 23 runs from the antenna exit opening 33 to the control unit 43.

The system further includes a ramp 4 for guiding animals 5 into the trailer 1 through the open side 3.

The system further includes a door closure 7, which is attached to pulley 9 on pulley rope 10, which is threaded through pulley hooks 8 at the top of the open side 3 and releasably attached to rope anchor 12 attached to the trailer 1. The pulley 9 may also be attached to rope 11, which is releasably attached to a rope anchor 12 attached to receptacle 1.

The top-trailer facing wall 65 of the mounting frame 21 is cut into a top-trailer facing wall left section 76 and top trailer-facing wall right section 77, and the top outer side wall 61 and the top inner side wall 69 is cut way to form the top cut-out 24 to provide clearance for pulley 9, pulley rope 10, and rope 11 used to open and close the door closure 7.

In addition, the left trailer-facing wall 64, left outer side wall 60, and left inner side wall 68 may be cut away to form a side cut out 25 providing the required clearance for surface feature 49 on the trailer 1.

The system further comprises an RFID tag 14 attached to the ear of the animal 5, for communication with the antenna 23. The RFID tag 14 carries a unique code identifying the animal 5.

The system further comprises a control unit 43 attached to the trailer 1, in communication with antenna 23, antenna tune button 45 and status LEDs 46. The control unit 43 contains an RFID reader for receiving and identifying signals in communication with the antenna 23, and a central processing unit ("CPU") in communication with the RFID reader, and, optionally other inputs, and as well as outputs, for processing and storing information received from the RFID reader and the other inputs and for sending out information to the optional outputs.

In one application of an embodiment of the invention, the control unit 43 may contain a CPU in communication with the RFID reader, a GPS antenna and receiver, and a GSM radio and antenna. For example, the control unit 43 may contain a CPU, GPS receiver, GSM radio, Bluetooth module, and user interface. In another embodiment, the system may further comprise an antenna 54 mounted on a support bracket 55 to the trailer 1. The antenna 54 comprises a GPS and a GSM antenna, connected to the control unit 43 through GSM cable 56 and GPS cable 57. The GSM antenna is in communication with GSM network 91 and 92 via satellite 90 and a data processor such as a remote database 94 or mobile phone 93.

In one embodiment, the control unit 43 may be housed in an enclosure and contain connectors for the RFID antenna 23, GPS antenna, GSM antenna, serial port, and power. The user interface may consist of a graphic display, rotary push button used for menu-driven systems, and control buttons.

A person skilled in the art will understand that antenna 23 may be of any suitable type for scanning RFID tags, including antennas comprising antenna coils.

While in the preferred embodiment the mounting frame 21 is made of fibreglass, the mounting frame 21 may be made of any non-metal material known in the art such as PVC, wood, or other material, as is known to a person skilled in the art, to possess sufficient structural strength for constructing the mounting frame 21. The mounting frame 21 may also be made of solid material, and may also comprise a tubular, ribbed, corrugated, honeycombed or otherwise hollowed-out structure.

While in the preferred embodiment self-tapping tapping screws 29 are used to attach the mounting frame 21 to the perimeter, any other means, such as bolts, fasteners, or glue may be used to attach the mounting frame 21 to the perimeter 16. While in the preferred embodiment the left out-facing wall 72, top out-facing wall 73, right out-facing wall 74, and bottom out-facing wall 75 have a number of threaded holes for mounting the antenna housing 22, the number and location of the threaded holes can vary as long as the there is a sufficient number of holes to mount the antenna housing 22 to the mounting frame.

The cable exit opening 32 may be located on any wall of the mounting frame 21, or it may be absent from the mounting frame 21. Furthermore, the antenna tune button 45 and status LEDs 46 may be mounted on any location of the mounting frame 21, antenna housing 22, or trailer 1, as long as they are in communication with the control unit 43. As such, the tune button cable 41 may be routed in any convenient way to maintain the antenna tune button 45 and status LEDs in communication with the control unit 43. The antenna tune button 45 and status LEDs may be housed in the control unit 43 itself.

In the preferred embodiment, the antenna housing 22 is made of solid PVC, but it may be hollow, ribbed, corrugated, honeycombed or otherwise hollowed-out non-metal material. Where the antenna housing 22 is not solid, the antenna 23 may be run inside any hollow space of the antenna housing 22 instead of an antenna channel 35. While in the preferred embodiment a series of housing bolts 27 are used to attach the antenna housing 22 to the mounting frame 21, screws 29 are used to attach the mounting frame 21 to the perimeter 16, any other means, such as bolts, fasteners, or glue may be used to attach the mounting frame 21 to the perimeter. While in the preferred embodiment the exit is on the side of the antenna housing 22, the antenna may exit through an opening at any location of the mounting frame.

While in the preferred embodiment of the invention, the tag 14 is carried on the ear 13 of the animal 5, the tag 14 may be carried around a collar, or affixed to any part of the animal, including carried internally by the animal.

While the control box 43 is the preferred embodiment is shown to be attached underneath the trailer 1, it may be mounted anywhere on the outside or inside of trailer 1, as long as it remains in communication with the antenna 23.

Furthermore, the doorway 3 may comprise a part of a wall 2 of trailer 1, or comprise an entire side of the trailer 1. Doorway 3 may be located in any side of the trailer 1.

While the preferred embodiment is illustrated with reference to an animal trailer, application of the present invention may be applied to any receptacle, such as a bus, or railway car, defining a chamber, and having an open side, with a perimeter for receiving an object, such as any type of animal, a piece of luggage, parcel, or a human. The tracked object may carry an RFID tag on any location on or inside the object, as long as the RFID tag remains in the range of the antenna around the perimeter of the open side as the object passes through the open side.

In addition, while in the preferred embodiment the invention is described to comprise a mounting frame 21 mounted to the trailer 1 and the antenna housing 22 containing the antenna 23 attached to the mounting frame 21, in another embodiment, the present invention comprises a RFID antenna 23 attached to the perimeter at a predetermined distance from trailer 1. In this embodiment, the antenna 23 may be attached to the perimeter by any means, such as brackets, fasteners or others as would be known to a person skilled in the art.

In another embodiment, the present invention comprises a mounting frame 21 attached to the perimeter and the antenna 23 attached to the mounting frame 21.

In a further embodiment, the present invention comprises the antenna 23 attached to the antenna housing 22, with the antenna housing being attached to the perimeter at a predetermined distance from trailer 1.

The operation of the present invention is described in reference to a system for tracking cattle exemplified in by the preferred embodiment. In the preferred embodiment, each head of cattle 5 is equipped with an RFID tag 14 carrying an unique identifier. As each head of cattle 5 equipped with tag 14 is loaded through doorway 3, its unique RFID tag signal is received by the antenna 23 and identified by the RFID reader. The identified signal is logged by the CPU and the tag 14 is marked as loaded by the CPU. The next time the CPU receives the same identification number, the tag is marked as unloaded. The antenna tune button 45 is used to tune the antenna 23 when status LEDs indicate that the antenna 23 is not in tune.

In one application of the present invention, while powered, the system maintains a GSM connection and periodically takes a GPS position via a GPS antenna housed in antenna 54. Before the loading and unloading of cattle, the RFID antenna is turned on and is tuned, optionally automatically. When a cattle unique identifier is read by the antenna 23, the RFID reader identifies the unique identifier, and the CPU couples the unique identifier signal with the current GPS position, information as to whether a particular tag is loaded or unloaded, the date and time of the loading or unloading event, and transmits this information across the GSM network 91 and 92 via satellite 90 to a data processor such as a remote database 94. Optionally, this information may be accessible via a mobile phone 93. Optionally, an operator of the system may print a manifest via an integrated Bluetooth interface.

In another application of the present invention, the system may also be used as an automated vehicle and animal tracking system. In this capacity, the system takes a GPS position via GPS antenna housed in antenna 54 and reports the position of individual trailers and animals transported on the trailers via GSM network 91 and 92 and satellite 90 to a monitoring station, to produce a real-time, on-line fleet management system.

In yet another application of the present invention, the system may incorporate sensors mounted on and around the trailer to gather, store, and transmit via GSM network 91 and 92 and satellite 90 to a monitoring station data relating to parameters related to the welfare of transported animals, such as temperature, air quality, and physical impact.

It should be understood that every maximum numerical limitation given throughout this specification would include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A system for tracking objects loaded into a receptacle, said receptacle defining a chamber having an open side for receiving said objects, said receptacle having a perimeter about said open side, the system comprising:
    a radio frequency identification antenna attached to said perimeter, the antenna being spaced from said receptacle;
    a spacing means disposed between the receptacle and the radio frequency identification antenna;
    a radio frequency identification reader attached to said receptacle for receiving a signal from said antenna; and
    a control unit communicating with said reader for processing said signal, the control unit being attached to the receptacle.

2. The system according to of claim 1, wherein the control unit further comprises a central processing unit in communication with the radio frequency identification reader.

3. The system of claim 1, wherein the antenna is an antenna coil.

4. The system according to claim 3 wherein the antenna housing defines a hollow interior, the antenna coil being positioned in said hollow interior.

5. The system according to claim 1 wherein the control unit further comprises a GPS antenna.

6. The system according to claim 1, wherein the control unit further comprises a GSM antenna.

7. The system according to claim 1, wherein the receptacle is attached to or forms part of a vehicle.

8. A system for tracking objects loaded into a receptacle, said receptacle defining a chamber having an open side for receiving said objects, said receptacle having a perimeter about said open side, the system comprising:
- a mounting frame attached to said perimeter;
- a radio frequency identification antenna attached to said mounting frame, the radio frequency identification antenna being spaced from said receptacle;
- a radio frequency identification reader attached to said receptacle for receiving a signal from said antenna; and
- a control unit communicating with said reader for processing said signal, the control unit being attached to the receptacle.

9. The system according to claim 8 wherein an antenna housing is attached to the mounting frame, the RFID antenna being coupled to the antenna housing.

10. The system according to claim 8, wherein the mounting frame is composed of fiberglass.

11. The system of claim 8, wherein the control unit further comprises a central processing unit in communication with the radio frequency identification reader.

12. The system of claim 8, wherein the antenna is an antenna coil.

13. The system according to claim 8, wherein the control unit further comprises a GPS antenna.

14. The system according to claim 8, wherein the control unit further comprises a GSM antenna.

15. The system according to claim 8, wherein the receptacle is attached to or forms part of a vehicle.

* * * * *